United States Patent [19]

Suman

[11] Patent Number: 5,223,814
[45] Date of Patent: Jun. 29, 1993

[54] SENSOR FOR VEHICLE ACCESSORIES

[75] Inventor: Michael J. Suman, Holland, Mich.

[73] Assignee: Prince Corporation, Holland, Mich.

[21] Appl. No.: 792,288

[22] Filed: Nov. 14, 1991

Related U.S. Application Data

[63] Continuation-in-part of Ser. No. 567,390, Aug. 14, 1990, which is a continuation-in-part of Ser. No. 279,643, Dec. 5, 1988, abandoned.

[51] Int. Cl.$^5$ .................. G08B 25/00; H01J 40/14
[52] U.S. Cl. .................. 340/525; 340/461; 362/83.1; 250/200; 250/214 AL
[58] Field of Search .............. 340/525, 461, 462, 980; 362/82.1, 80.1; 250/336.1, 200, 214 AL

[56] References Cited

U.S. PATENT DOCUMENTS

| Re. 32,576 | 1/1988 | Pastore | 350/600 |
|---|---|---|---|
| 1,522,241 | 1/1925 | Hennessey . | |
| 3,300,867 | 1/1967 | Marcus | 296/37.7 |
| 3,680,951 | 8/1972 | Jordan et al. | 350/281 |
| 4,103,430 | 8/1978 | Schrader | 33/348 |
| 4,247,850 | 1/1981 | Marcus | 340/694 |
| 4,309,828 | 1/1982 | Sakamoto | 33/355 |
| 4,341,023 | 7/1982 | Marcus et al. | 33/363 K |
| 4,424,631 | 1/1984 | Franks | 33/361 |
| 4,425,717 | 1/1984 | Marcus | 33/361 |
| 4,443,057 | 4/1984 | Bauer et al. | 350/281 |
| 4,447,808 | 5/1984 | Marcus | 340/696 |
| 4,488,777 | 12/1984 | Bauer et al. | 350/279 |
| 4,499,451 | 2/1985 | Suzuki et al. | 340/98 |
| 4,580,875 | 4/1986 | Bechtel et al. | 350/278 |
| 4,581,827 | 4/1986 | Higashi | 33/333 |
| 4,588,267 | 5/1986 | Pastore | 350/600 |
| 4,630,904 | 12/1986 | Pastore | 350/600 |
| 4,635,033 | 1/1987 | Inukai et al. | 340/705 |
| 4,678,281 | 7/1987 | Bauer | 350/331 |
| 4,701,022 | 10/1987 | Jacob | 350/278 |
| 4,793,690 | 12/1988 | Gahan et al. | 350/279 |
| 4,820,933 | 4/1989 | Hong et al. | 307/10.1 |
| 4,825,210 | 4/1989 | Bachhuber et al. | 340/825.31 |
| 4,882,565 | 11/1989 | Gallmeyer | 340/461 |
| 5,016,996 | 5/1991 | Ueno | 340/441 |

Primary Examiner—Donnie L. Crosland
Attorney, Agent, or Firm—Price, Heneveld, Cooper, DeWitt & Litton

[57] ABSTRACT

A vehicle accessory includes a reflective element for reflecting light to a photo-sensor positioned within the accessory's housing for controllably detecting an ambient light level. The vehicle accessory may also include a display source for generating vehicle information which is positioned in the housing to utilize the reflective element to also reflect an image from the display source to a driver of the vehicle.

22 Claims, 1 Drawing Sheet

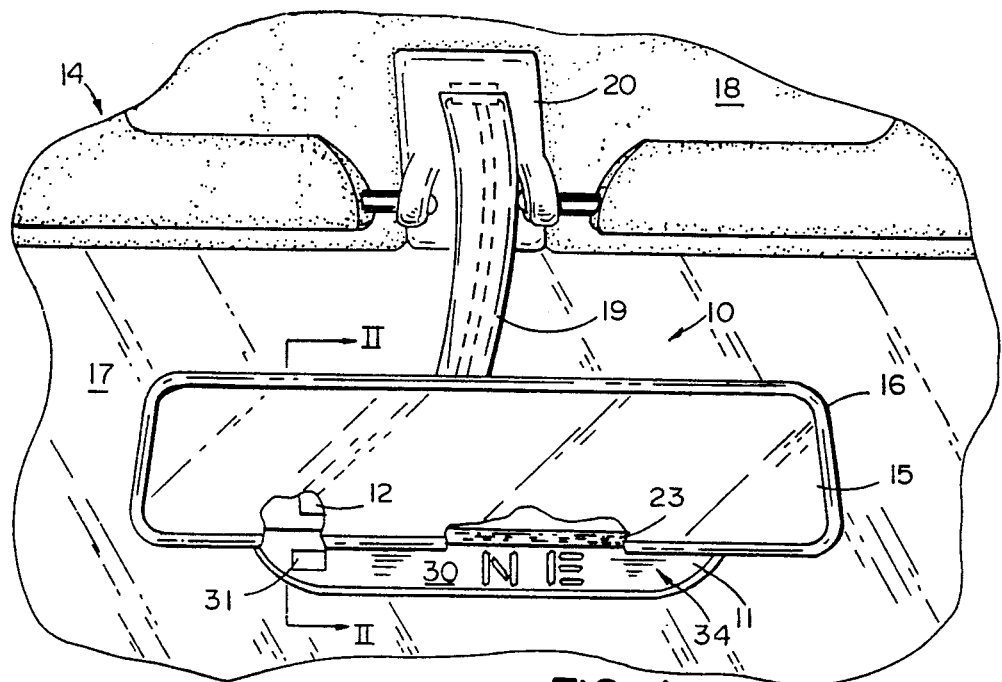
FIG. 1
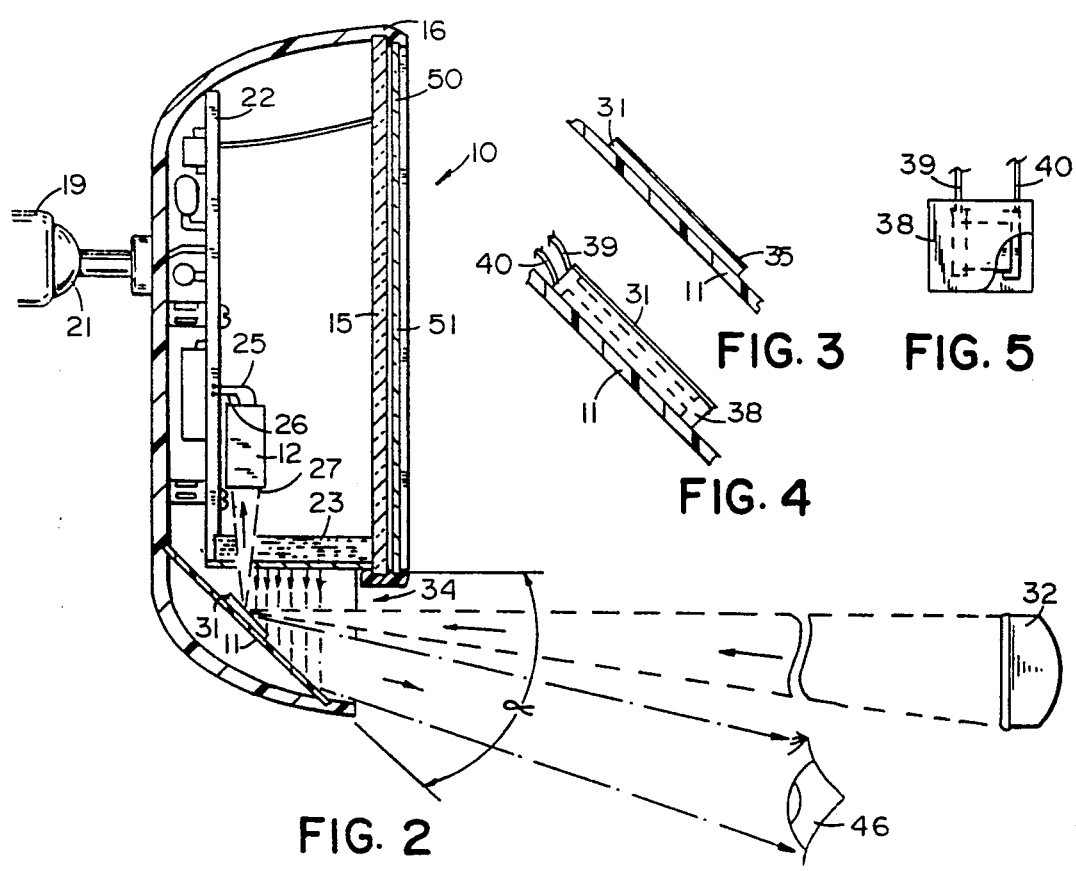
FIG. 3  FIG. 5
FIG. 4
FIG. 2

SENSOR FOR VEHICLE ACCESSORIES

This application is a continuation-in-part of co-pending U.S. patent application Ser. No. 07/567,390, filed Aug. 14, 1990, entitled ELECTRICAL CONTROL SYSTEM FOR VEHICLE OPTIONS, which is a continuation-in-part of co-pending U.S. patent application Ser. No. 07/279,643, filed Dec. 5, 1988 now abandoned, entitled MIRROR COMPASS.

BACKGROUND OF THE INVENTION

The present invention pertains to vehicle accessories with electrical options and more particularly, to ambient light sensors for vehicle accessories.

Vehicles are often provided with a variety of accessories. One popular vehicle accessory is an electrically adjustable rearview mirror which responds to sensed light, such as the headlights from a trailing vehicle, to change the reflectivity of the rearview mirror for glare reduction. Electrical adjustment of these mirrors is typically provided by a prism mirror having two reflective states or an optical transmission plate with electrically controlled optical properties. Regardless of whether a prism mirror or an optical plate is used to control the mirror reflectivity, these mirrors include a control circuit which generates an electrical control signal. The electrical control signal is applied to a motor of a prism mirror or the optical transmission plate. The control signal is generated as a function of one or more ambient light levels which are typically detected by two light sensors. A rearward light sensor detects the ambient light level in front of the rearview mirror (toward the rear of the vehicle) and a forward light sensor detects the ambient light level behind the rearview mirror (toward the front of the vehicle).

A difficulty presented by electrically adjustable rearview mirrors is accommodating the rearward facing light sensor. The rearward facing sensor typically includes a photo-sensor with a light responsive surface facing the rear of the vehicle. The photo-sensor is sometimes mounted in a mirror housing to receive light through an optical opening in the reflective surface of the rearview mirror. However, this discontinuity in the rearview mirror surface may partially obstruct the vehicle operator's vision behind the vehicle. Alternatively, it is known to mount the light sensor in a sensor housing below the mirror housing. The sensor housing includes an opening facing the rear of the vehicle which passes light onto a photo-sensor supported within the sensor housing. Although the photo-sensor housing does not obstruct the driver's vision behind the vehicle, it requires electrical conductors which extend between the photo-sensor and an electrical circuit board which is typically carried in the mirror housing. Assembling the sensor housing to a rearview mirror housing can be costly due to the labor and materials required to connect the sensor and the rearview mirror electrical circuit board and to construct and attach the sensor housing to the rearview mirror housing. Such construction also provides another potential area for a defect to occur.

SUMMARY OF THE INVENTION

The system of the present invention represents an improvement over the prior art by providing a light sensor supported within an accessory housing which receives light from a reflective element. In one aspect of the invention, the photo-sensor is supported within a rearview mirror housing and receives light from a reflective element positioned on the rearview mirror housing. Thus, the light sensor is mounted in a rearview mirror housing and senses an ambient light level without interfering with the driver's vision through a rearview mirror or requiring the assembly of a sensor housing below the rearview mirror housing.

In another aspect of the invention, a vehicle accessory includes a sensor and a display source supported in the accessory housing. The display source generates vehicle driving information, such as temperature and/or vehicle heading information, and a reflective element reflects the information from the display source for viewing by an occupant of the vehicle. The reflective element also reflects light to the light sensor supported inside the accessory housing. Accordingly, when the light sensor is utilized with a display source including a reflective element, the reflective element also reflects light to the ambient light sensor.

These and other features, objects and advantages of the present invention will become apparent upon reading the following description thereof together with reference to the accompanying drawings in which:

BRIEF DESCRIPTION OF THE DRAWINGS

FIG. 1 is a fragmentary front elevational view, partly broken-away, of the interior of a vehicle including a rearview mirror embodying the present invention;

FIG. 2 is an enlarged fragmentary cross-sectional view taken along section lines II—II of FIG. 1 and a schematic view of the environment of the invention;

FIG. 3 is an enlarged fragmentary cross-sectional view of the reflective element and a color filter according to one alternate embodiment of the invention;

FIG. 4 is an enlarged fragmentary cross-sectional view of the reflective element and a switch according to another alternate embodiment of the invention; and FIG. 5 is an top elevational view, partly broken-away, of the switch of FIG. 3.

DETAILED DESCRIPTION OF THE PREFERRED EMBODIMENTS

Referring now to the drawings and the illustrative embodiment depicted therein, FIG. 1 illustrates an interior rearview mirror assembly 10 for a vehicle 14 such as an automobile. Assembly 10 includes a reflective element 11 and a photo-sensor 12 of the present invention. Rearview mirror assembly 10 is of the adjustable day/night variety including a mirror 15 supported within a mirror housing 16 centrally located in the vehicle adjacent the vehicle windshield 17 and vehicle headliner 18. The reflective element 11 is positioned within mirror housing 16 above or below mirror 15 while photo-sensor 12 is mounted within the mirror housing 16 adjacent reflective element 11 to receive light which impinges upon reflective element 11. Although the light sensing system is illustrated in conjunction with a rearview mirror, those having ordinary skill in the art will recognize that the light sensing system may be utilized in other vehicle accessories. For example, the light sensing system could be utilized in an overhead console which includes a display source having a light intensity which varies responsive to an ambient light level.

Rearview mirror housing 16 is connected to vehicle headliner 18 using a stem 19. Although rearview mirror assembly 10 is illustrated attached to the vehicle headliner 18, those skilled in the art will recognize that mirror assembly 10 can be mounted to the vehicle windshield 17. The stem 19 and base 20 of the preferred embodiment each include electrical and mechanical connectors (not shown) which are removably interconnected for mounting the mirror assembly 10 to headliner 18. A particularly advantageous stem and base attachment structure for a rearview mirror is disclosed in co-pending patent application Ser. No. 07/685,880, filed Apr. 15, 1991, entitled MODULAR MIRROR WITH ELECTRICAL ACCESSORIES and co-pending patent application Ser. No. 07/685,292, filed Apr. 12, 1991, entitled MODULAR MIRROR WITH ELECTRICAL ACCESSORIES, A ball 21 (FIG. 2) mounted on housing 16 is received in stem 19 to permit the position of housing 16 to be adjusted by the vehicle driver.

The electrical components of the rearview mirror assembly 10 are supported on a circuit board 22 within mirror housing 16 and electrically connected to the vehicle electrical system through stem 19 and base 20 electrical connectors (not shown). The electrical components on circuit board 22 include a light sensing circuit, a reflectivity control circuit for the rearview mirror 15, a display source 23, which generates a display image, and other electrical rearview mirror accessories, such as a trainable garage door opener remote control. The electrical components of the rearview mirror include the control circuit set forth in co-pending application 07/567,390, although the photo-sensor 12 and reflective element 11 can be advantageously utilized with any known sensor and control circuit for detecting an ambient light level, and more specifically with any rearview mirror having a reflectivity which is electrically adjustable.

The light sensing system includes a photo-sensor 12 which can be of a type generally well known to those having ordinary skill in the art. The preferred embodiment of the invention utilizes a photo-resistor connected as one impedance of a voltage divider circuit which is part of the circuitry contained on circuit board 22. The photo-resistor is connected by conductors 25, 26 (FIG. 2) to other electrical components on circuit board 22, and has a resistance inversely proportional to the light incident on light responsive surface 27. The voltage divider generates a reference signal which is applied to an analog-to-digital converter for input to a microcontroller which also are part of the electrical circuit contained o board 22. The light responsive surface 27 of photo-sensor faces reflective element 11 when the photo-sensor is mounted on circuit board 22 and board 22 is mounted in housing 16 as shown in FIG. 1.

The light sensing system according to one embodiment of the invention is used with a reflective element 11, shown in cross-section in FIG. 2. The reflective element according to a preferred embodiment of the invention is a black plastic element having a reflective surface, but may include glass with a reflective mirror surface or metal with a highly polished surface. Reflective element 11 is glued, or otherwise affixed, to the interior side of housing 16 with a reflective surface 30 facing the exterior of the mirror assembly such that it is visible to a vehicle driver or other occupant of the vehicle. The reflector element 11 is preferably flat, and mounted at an angle α, which is between 35° and 55° relative to a display source 23, which is described in greater detail below. Preferably the reflective element is mounted at an angle of 45° relative to display source 23 and light responsive surface 27 of photo-sensor 12.

According to one embodiment of the invention, a photo-sensor reflective element 31 (FIG. 1) is positioned directly below the photo-sensor 12 on reflective element 11. The photo-sensor reflective element 31 preferably includes a highly reflective surface, such as a silver or chrome finished material which can include plastic, a metal with a highly polished surface, or glass with a silver mirror backing surface. Photo-sensor reflective element 31, according to a preferred embodiment, is a shiny silver or chrome finished foil applique' affixed to the surface of black plastic reflective element 11 using a self-sticking pressure sensitive adhesive. The highly reflective surface of element 31 reflects light from a light source 32, which represents a trailing vehicle's headlight, such that it impinges upon light responsive surface 27 of photo-sensor 12. Naturally, a separate reflector element 31 would not be necessary where reflector element 11 itself has a highly reflective surface such as that provided by a polished metal or glass with a mirror surface. Where the light sensing system is utilized without a display system, reflective element 31 would be used without reflective element 11 and located along the bottom or top edge of housing 16.

The reflector element 31, or reflective element 11 if reflector element 31 is not used, and housing 16 control the light incident upon light responsive surface 27 of photo-sensor 12 such that photo-sensor 12 detects light only from a controlled direction and location rearward of the vehicle. Housing 16 shields photo-sensor 12 such that light can only enter the mirror housing through opening 34 below mirror 15. In one embodiment of the invention, a color filter 35 (FIG. 3) is affixed to the surface of reflector element 31, or reflective element 11 if reflector element 31 is not used, using a transparent glue. The color filter may, for example, absorb light from light sources such as sodium vapor street lights but transmits light from light sources such as halogen vehicle head lamps. The color filter prevents a decrease in the reflectivity of mirror 15 responsive to high levels of ambient light. Accordingly, photo-sensor 12 accurately detects light from rearward of a vehicle in which mirror assembly 10 is positioned due to the directional control provided by housing 16, reflector element 31 and, when used, color filter 32.

In an alternate embodiment of the invention, the photo-sensor reflective element 31 is positioned over a touch-sensitive switch 38 (FIG. 4) which is connected by electrical conductors 39, 40 to circuit board 22. The switch is preferably of the type having a low profile and responsive to finger contact for electrically coupling conductors 39 and 40 (FIG. 5) thereby completing a circuit which turns display source 23 on and off. The switch may be surface mounted on reflective element 11 using an adhesive, with the applique' 31 affixed thereon.

The reflective element 11 may be mounted above or below the rearview mirror. Positioning the reflective element 11 below mirror 15 permits the rearview mirror assembly 10 to be mounted in close proximity to the vehicle headliner without interfering with vehicle sunvisors, an overhead console, reading lights, map lights, or other headliner mounted assemblies. With the mirror housing in close proximity to headliner 18, an image reflected from the reflective element positioned below the rearview mirror is readily visible to the vehicle operator. Additionally, the photo-sensor reflective element 31 below mirror 15 is optimally positioned to sense the amount of light from a trailing vehicle headlight 32 which will impinge upon the vehicle operator's eye 46 when mirror 15 is positioned near headliner 18.

The reflective element 11 may alternatively be mounted above mirror 15, with the light responsive surface 27 of sensor 12 positioned below the reflective element to receive light reflected from the reflective element. The top mounted reflective element is particularly advantageous where mirror housing 16 is relatively remote from headliner 18. When mirror housing 16 is remote from headliner 18, a photo-sensor used with a top mounted reflective element is optimally positioned to detect the amount of light which mirror 15 will reflect into the vehicle operator's eyes. Additionally, the reflective element 11 above mirror 15 is optimally positioned to reflect vehicle information from a display source 23 without interfering with a driver's vision in front of the vehicle when mirror housing 16 is remote from headliner 18.

The light sensor 22 may be used in conjunction with a display source 23, which is preferably a reverse vacuum fluorescent display, such that the image from source 23 reflected off reflector element 20 will be readable to the driver of the vehicle. Alternate forms of display sources include a back lit liquid crystal display and light emitting diodes (LEDs). For example, red and white LEDs emit sufficient light to provide an image on reflector element 20 which may be easily viewed by the vehicle operator. The display source most preferably includes three large characters, each of which is 8 mm high, for generating alphanumeric vehicle heading information and/or numeric temperature information. Next to the three large characters, the display source includes three fixed characters which are vertically stacked over a temperature indicator. The three fixed characters are each 3 mm high for displaying a calibration indication "CAL." The temperature indicator includes a 2 mm circle and an overlay character which is 4 mm high. The circle and overlay characters selectively display "° C." or "° F.". The total width of all the characters of the preferred display is 24 mm. The display produces a light image having a brightness between 600 foot lamberts and 1200 foot lamberts, and most preferably outputs an image with a brightness of 900 foot lamberts. The display source according to a most preferred embodiment uses blue/green phosphorous, although other phosphorous colors may be used.

Mirror 15 is generally well known to those having ordinary skill in the art. The mirror may be provided by a prism mirror having two reflective states, the position of which is controlled by a motor as is well known. Alternately, and in the most preferred embodiment, mirror 15 is positioned behind an optical transmission plate 50 and a medium 51 whose optical properties are controlled by the application of an electrical signal thereto. For example the reflectivity of the mirror may be controlled by a fluid medium 51 disposed as a thin film between glass plate 50 and mirror 15 and responsive to electrical signals on conductor 52 to change its optical properties. These electrical signals are generated by the microprocessor in part in response to signals provided by sensor 12. The electrical control of such a mirror with multiple ambient light sensors, albeit at different locations, is well known.

In operation, a driver enters the vehicle and adjusts mirror assembly 10 such that mirror 15 is optimally positioned for viewing behind the vehicle. Display source 23 is most preferably mounted orthogonally to mirror 15 and reflective element 11 is orientated at an angle of approximately 45° with respect to display source 23 and mirror 15 as described above. Reflective element 11 thus reflects the image generated by display source 23 for viewing in front of the mirror by the vehicle driver. Adjustment of mirror 15 for optimum viewing also positions reflective element 11 for optimum viewing of the image generated by display source 23. Adjustment of the rearview mirror housing 16 also positions photo-sensor 12 to detect light from light source 32 which will be reflected by mirror 15 into the driver's eye 46.

Thus, it can be seen that a rearview mirror assembly is disclosed which includes a photo-sensor supported on a circuit board and is shielded inside a rearview mirror housing to selectively detect light only from a controlled direction and location rearward of the vehicle without impairing the driver's vision through the rearview mirror. Additionally, where the light sensor is utilized in a mirror with a reflector display source, the display reflective element is also utilized to control reflected light to the light sensor. Thus, the sensor and display source use a common reflective element.

It will become apparent to those skilled in the art the various modifications to the preferred embodiment of the invention as described herein can be made. For example, the photo-sensor and reflective element could be utilized in a vehicle accessory other than a rearview mirror such as an overhead console including a display source and an ambient light level responsive interior light. These and other modifications will, however, fall within the spirit or scope of the invention as defined by the appended claims.

The embodiments of the invention in which an exclusive property or privilege is claimed are defined as follows.

1. A rearview mirror assembly for a vehicle, comprising:
   a housing;
   a rearview mirror supported by said housing;
   means for sensing light supported by said housing; and
   a reflective element supported on said housing, wherein said reflective element is supported on said housing at a position adjacent said means for sensing light such that light incident upon said reflective element is reflected to said light sensing means.

2. A rearview mirror assembly as defined in claim 1, further including a display source supported by said housing, said reflective element positioned on said housing to reflect an image generated by said display source to a driver of said vehicle.

3. A rearview mirror assembly as defined in claim 2, and further including a switch with a highly reflective surface mounted on said reflective element, said highly reflective surface positioned to reflect light to said light sensing means.

4. A rearview mirror assembly as defined in claim 2, wherein said reflective element includes a reflector positioned adjacent said means for sensing light, wherein said reflective element has a reflective surface with a first degree of reflectivity over most of its surface area and said reflector has a second degree of reflectivity, said second degree of reflectivity being greater than said first degree of reflectivity.

5. A rearview mirror assembly as defined in claim 2, further including a circuit board supported within said housing, and wherein said display source and said means for sensing light are mounted on said circuit board.

6. A rearview mirror assembly as defined in claim 5, wherein said display source is supported in said housing substantially orthogonally to said rearview mirror, and said reflective element is at an angle of from about 35 degrees to about 55 degrees with respect to a surface of said display source.

7. A rearview mirror assembly as defined in claim 2, wherein said reflective element includes a black plastic element.

8. A rearview mirror assembly as defined in claim 7, further including a highly reflective applique' positioned on said black plastic element adjacent said means for sensing light.

9. A rearview mirror assembly as defined in claim 8, wherein said reflective element is supported on said housing below said rearview mirror.

10. A vehicle rearview mirror assembly, comprising:
   a rearview mirror housing;
   a rearview mirror supported on said rearview mirror housing;
   means for adjusting the amount of light reflected by said mirror to a driver of said vehicle;
   means for sensing an ambient light level supported on said housing, said means for sensing generating an output signal, wherein said means for adjusting the light reflected from said mirror to said driver is coupled to said sensing means and is responsive to said output signal of said sensing means; and
   reflecting means supported by said housing to reflect light to said sensing means which responds thereto for generating said output signal.

11. A rearview mirror as defined in claim 10 and further including a display source supported on said rearview mirror housing for generating an image of vehicle information for display to a vehicle operator, and wherein said reflecting means is supported on said housing to reflect said image generated by said display source such that said image is visible to the vehicle operator.

12. A rearview mirror as defined in claim 11 wherein said reflecting means has a greater degree of reflectivity adjacent said photo-sensor than adjacent said display source.

13. A rearview mirror as defined in claim 11 further including a circuit board supported in said rearview mirror housing, said circuit board mounted generally parallel to said mirror.

14. A rearview mirror as defined in claim 13 wherein said display source is supported on said circuit board substantially orthogonally to said mirror.

15. A rearview mirror as defined in claim 14 wherein the reflective surface of said reflecting means and the display source form an angle of approximately forty-five degrees.

16. A rearview mirror as defined in claim 15 wherein said reflecting means includes a highly reflective applique' positioned on a reflective element.

17. A vehicle accessory, comprising:
   an accessory housing defining an interior space and having an opening at one edge thereof;
   sensor means supported by said housing within said interior space for detecting light and generating an output signal dependent upon said detected light; and
   reflecting means mounted on said housing adjacent said opening to reflect light from outside said housing onto said sensor means within said housing such that said sensor means generates said output signal dependent upon detected ambient light from outside said housing.

18. A vehicle accessory as defined in claim 17 further including a display source adapted to generate an image of vehicle information, and wherein said reflecting means is positioned adjacent said display source to reflect an image generated by said display source to the driver of the vehicle.

19. A vehicle accessory as defined in claim 18 wherein said reflecting means light has a greater degree of reflectivity adjacent said sensor means than adjacent said display source.

20. A vehicle accessory as defined in claim 17 wherein said reflecting means includes a polished metal applique'.

21. A vehicle accessory as defined in claim 17 wherein said reflecting means is supported on said housing at an angle of approximately 45° with respect to a light responsive surface of said sensor means.

22. A vehicle accessory as defined in claim 17 further including a switch supported on said housing, said reflecting means being affixed to said switch.

* * * * *

UNITED STATES PATENT AND TRADEMARK OFFICE
CERTIFICATE OF CORRECTION

PATENT NO. : 5,223,814
DATED : June 29, 1993
INVENTOR(S) : Michael J. Suman

It is certified that error appears in the above-indentified patent and that said Letters Patent is hereby corrected as shown below:

Column 3, line 49: "o board" should be --on board--.

Signed and Sealed this

Twenty-sixth Day of April, 1994

Attest:

BRUCE LEHMAN

Attesting Officer    Commissioner of Patents and Trademarks